United States Patent [19]
Tabachenko

[11] Patent Number: 6,017,266
[45] Date of Patent: Jan. 25, 2000

[54] DYNAMIC COMPENSATING MACHINE TOOL CHUCK

[75] Inventor: Oleg Tabachenko, Fair Lawn, N.J.

[73] Assignee: The Goss and DeLeeuw Machine Company, Kensington, Conn.

[21] Appl. No.: 08/887,598

[22] Filed: Jul. 3, 1997

[51] Int. Cl.[7] .................................................. B24B 41/04
[52] U.S. Cl. .......................................... 451/385; 451/398
[58] Field of Search .................................. 451/385, 381, 451/398, 402, 379

[56] References Cited

U.S. PATENT DOCUMENTS

| | | |
|---|---|---|
| 2,709,599 | 5/1955 | Mann . |
| 2,948,541 | 8/1960 | Reich . |
| 3,087,737 | 4/1963 | Werth . |
| 3,938,815 | 2/1976 | Geppert . |
| 4,009,888 | 3/1977 | Wallace . |
| 4,026,566 | 5/1977 | Röhm . |
| 4,047,723 | 9/1977 | Buck . |
| 4,078,814 | 3/1978 | Röhm . |
| 4,275,892 | 6/1981 | Röhm . |
| 4,709,512 | 12/1987 | Okubo et al. ............................ 451/385 |
| 5,326,114 | 7/1994 | Piotrowski . |

FOREIGN PATENT DOCUMENTS

| | | |
|---|---|---|
| 1107731 | 1/1956 | France . |
| 1477246 | 6/1969 | Germany . |
| 7-051907 | 2/1995 | Japan . |
| 7-051908 | 2/1995 | Japan . |
| 1154011 | 2/1979 | United Kingdom . |

OTHER PUBLICATIONS

Translation of Japanese Doc. No. 07051908.
Translation of Japanese Doc. No. 07051907

*Primary Examiner*—Robert A. Rose
*Attorney, Agent, or Firm*—McCormick, Paulding & Huber LLP

[57] ABSTRACT

An improved machine tool chuck is described in which the chuck body has a rotational axis and master jaws mounted in grooves provided on the surface of the chuck body. Each master jaw is dynamically balanced and includes a gripping jaw and an associated ungripping jaw, mounted within one of the grooves on opposite sides of the rotational axis, and a bridging member that fixedly attaches the gripping jaw and associated ungripping jaw across the rotational axis of the chuck body.

32 Claims, 4 Drawing Sheets

DYNAMIC COMPENSATING MACHINE TOOL CHUCK

FIELD OF THE INVENTION

The invention relates to a high speed machine tool chuck. More specifically, the invention relates to a high speed machine tool chuck for rotating a workpiece around a rotational axis at a high rotational speed. The chuck is self-centering and has a unique internal centrifugal force neutralization system. The invention is further directed to a novel set of counterbalanced top jaws that can be selectively mounted to a machine tool chuck and dynamically compensate for the effects of centrifugal forces during rotation.

DESCRIPTION OF THE PRIOR ART

In general, machine tool chucks include a rotationally symmetrical chuck body mounted to a rotatable machine tool spindle. The chuck body has a plurality of (usually three or four) top jaws that provide an inward directed force to clamp a workpiece so that the workpiece can be acted on by the machine tool during rotation of the chuck. Machine tool chucks can be either self-centering, in which case activation of the chuck simultaneously moves each top jaw an equal distance inward or outward to clamp the workpiece in alignment with the rotational axis of the chuck body, or require the manipulation of each individual top jaw in order to clamp and align the workpiece.

High speed rotation of a chuck generates centrifugal forces that act outwardly on each top jaw of the chuck, significantly reducing inward directed clamping forces applied by the top jaws. This outward centrifugal force increases exponentially with increases in rotational speed, and can cause significant loss of clamping force, even at a relatively low rotational speed. In fact, depending on jaw weight, most common air powered chucks do not generate a safe clamping force on the workpiece at 3000 RPM. This problem has become even more acute with the advent of cutting tools, such as carbide cutting tools coated with titanium nitride and ceramic cutting tools, and the widespread use of lighter materials, such as aluminum and plastic, with which the rotational speed of the machine tool can advantageously be raised to 5,000 to 10,000 RPM, and in some cases to 15,000 RPM.

Also, other problems result from the variation between the clamping force applied to the workpiece by the top jaws in the loading position when the chuck is not rotated, and during machining when the chuck is rotated at a high speed. Specifically, to compensate for the clamping force reduction due to centrifugal force, the clamping force applied to workpiece in the loading position must be increased. However, such excessive gripping force can cause crushing and distortion of precision parts, especially those having thin walls.

Chucks have been designed to attempt to compensate for centrifugal forces generated by high speed rotation. For example, such chucks are described in U.S. Pat. Nos. 3,087,737 to Werth; 4,047,723 to Buck: 4,078,814 to Rohm; and British Patent No. 1,541,011 to Alfred Herbert, Ltd. These chucks attempt to compensate for centrifugal force by pushing back the top jaws using various mechanisms, such as air or hydraulic cylinders that apply addition force on the chuck plunger, or sliding or pivoting counterweights that, under the effect of centrifugal force, push back the top jaws using levers or similar devices. At best, these devices have only been able to diminish the effects of centrifugal force. Moreover, they require the chuck to be larger, more complex and more costly to produce.

U.S. Pat. No. 3,938,815 to F'Geppert is directed to a machine tool chuck in which each top jaw is attached by a tensioned connector to a counterweight and are slidable within a groove. The position of the top jaws and counterweights, relative to the rotational axis of the chuck, can be varied by rotating a threaded rod that passes through each top jaw to engage the counterweight. However, this chuck is not internally force neutral or self-centering and requires the separate positioning of each top jaw. Additionally, the threaded rods relied on to adjust the top jaws are relatively delicate and can loosen or break during high speed rotation, allowing the workpiece to release or, at the very least, upsetting the balance between the counterweight and associated top jaw.

Furthermore, many prior devices depended on pneumatic or hydraulic pressure to provide a clamping force to the top jaws of the chuck. However, such chucks rely on an outside source of pressure that can fail suddenly due, for example, to an interruption in the power supply to the pressure source. Such a failure will cause the catastrophic release of the workpiece that will be thrown from the chuck at a high rate of speed by centrifugal force.

A chuck should allow for interchangability between various top jaws having different configurations and being formed of different materials, while maintaining the desired accurate alignment and a suitable gripping and dynamic compensating forces. Prior art devices have not provided for different "pushback" forces for different applications of the chuck, and changes amongst, for example, aluminum and steel top jaws, high and low profile jaws, and jaws for big and small workpieces. Furthermore, it would be advantageous to provide a chuck capable of clamping on the inside diameter (ID) or outside diameter (OD) of a workpiece, without requiring the replacement of the top jaws.

Heretofore, there has been a need for a self-centering, high-speed, internally balanced machine tool chuck that allows for the counterbalancing of a plurality of different top jaws regardless of the size, shape or material of the top jaw, and fully compensates for diminished workpiece gripping forces caused by the action of centrifugal force. Moreover, the chuck must not be complex, should be easily manufactured with precision, and should allow for interchangability between top jaws without disassembly of the chuck body. Additionally, the chuck preferably should be actuated in the same manner for clamping a workpiece on an inside diameter (ID) as for clamping an outside diameter (OD).

SUMMARY OF THE INVENTION

It is an object of the present invention to provide a high speed, machine tool chuck that is internally centrifugal force neutral so that the clamping mechanism, absent the top jaws, does not contribute to any inherent centrifugal force imbalance upon rotation.

It is another object of the present invention to provide such a chuck that is self centering so that activation of the chuck simultaneously moves each top jaw an equal distance inward or outward to clamp the workpiece in alignment with the rotational axis of the chuck body.

It is an additional object of the present invention to provide a chuck in which the top jaw acts as an OD clamping jaw and the corresponding counterbalance functions as an ID clamping jaw and vice versa.

It is also an object of the present invention to provide a chuck that is actuated in the same manner to clamp workpieces on an inside diameter or an outside diameter.

It is a still further object of the present invention to provide a chuck in which the master jaws are guided across the entire diameter of the chuck so that cocking or "pushout" of the top jaws under clamping pressure and the resulting loss of accuracy do not occur.

It is a still further object of the present invention to provide a chuck in which the top jaws clamping a workpiece are counterbalanced in any application regardless of their size, material or configuration.

It is a still further object of the present invention to provide a chuck in which gripping and ungripping master jaws are located on the opposite sides of the rotational axis.

It is a still further object of the present invention to provide a chuck in which the activating device is a plunger having a plurality of pairs of camming surfaces, each pair including a gripping surface and an ungripping surface located on opposite sides of a rotational axis.

DETAILED DESCRIPTION OF THE PREFERRED EMBODIMENTS

Figure 1:
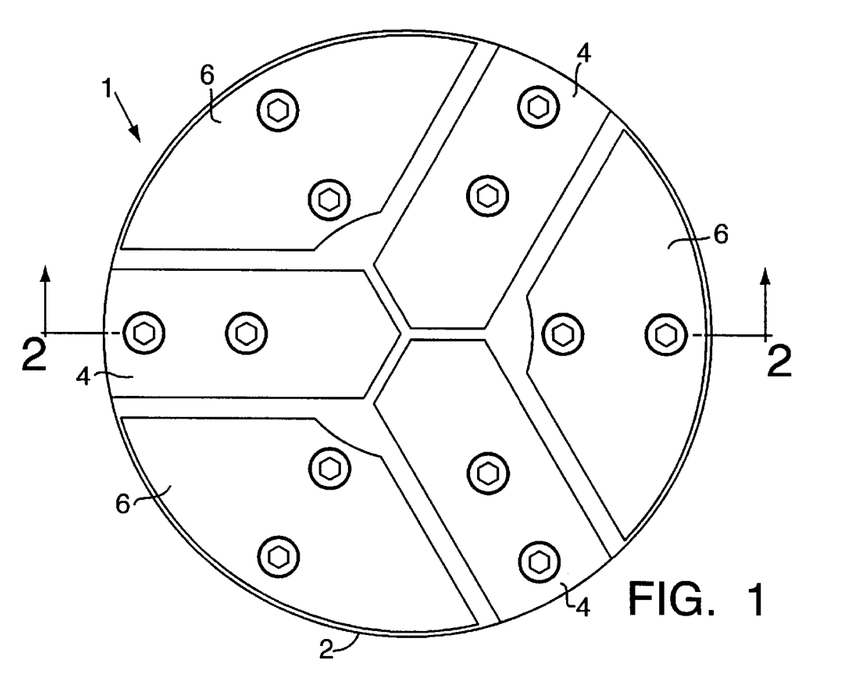
FIG. 1 is a top plan view of the chuck of a first embodiment of the present invention.

Referring to the figures and, in particular, FIG. 1, the present invention is a chuck generally represented by reference numeral 1. The chuck 1 comprises a chuck body 2 and a plurality of movable outer diameter (OD) top jaws 4. The OD jaws 4 are adapted to apply a clamping force to the outside diameter of a workpiece (not shown) positioned between the OD jaws, in alignment with the rotational axis of chuck body 2. For each OD jaw 4, there is provided a corresponding inside diameter (ID) top jaw 6 on the opposite side of the rotational axis of chuck body 2. The ID jaws 6 are adapted to apply a clamping force to the inside diameter of a workpiece (not shown) positioned around ID jaws 6, in alignment with the rotational axis of chuck body 2. In rotation, OD jaw 4 and the corresponding ID jaw 6 counterbalance each other to dynamically compensate for centrifugal force.

Figure 2:
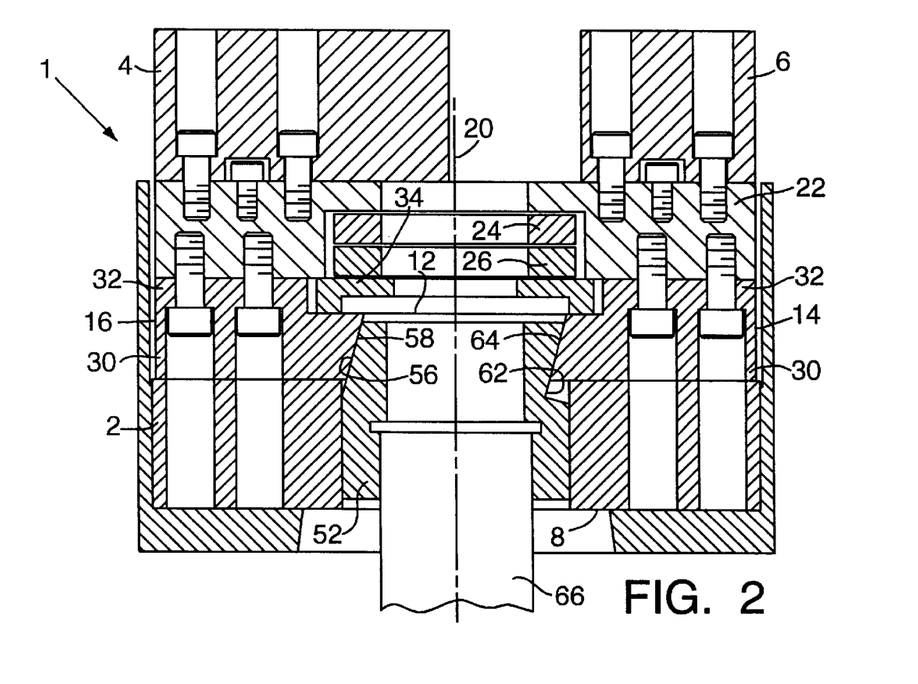
FIG. 2 is a transverse, sectional view taken on line 2—2 of FIG. 1, in which the chuck is provided with an adapter for connection to the rotating spindle of a machine tool.
Figure 7:
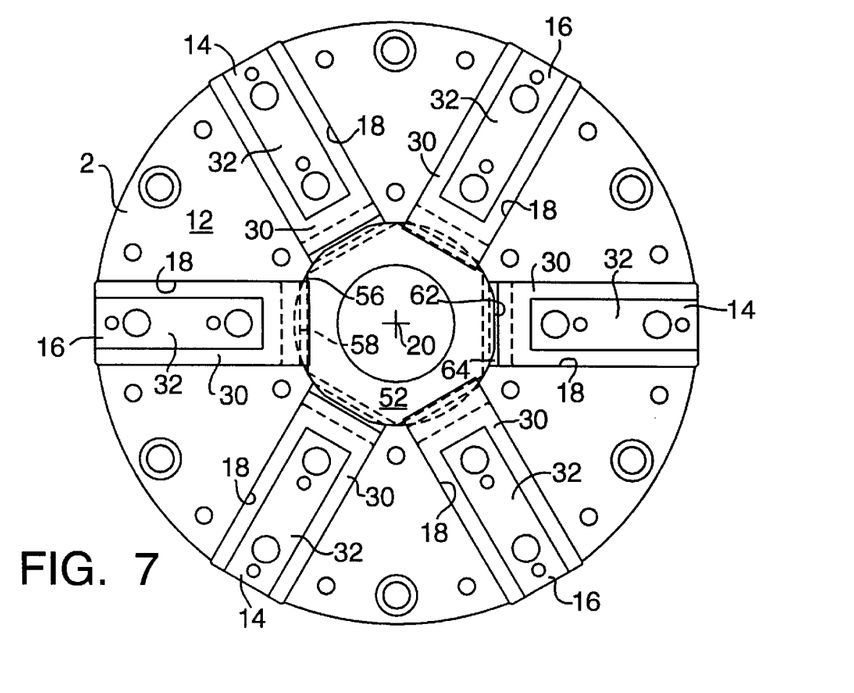
FIG. 7 is a top plan view of the chuck of FIG. 1 with the top jaws and bridging members removed.
Figure 8:
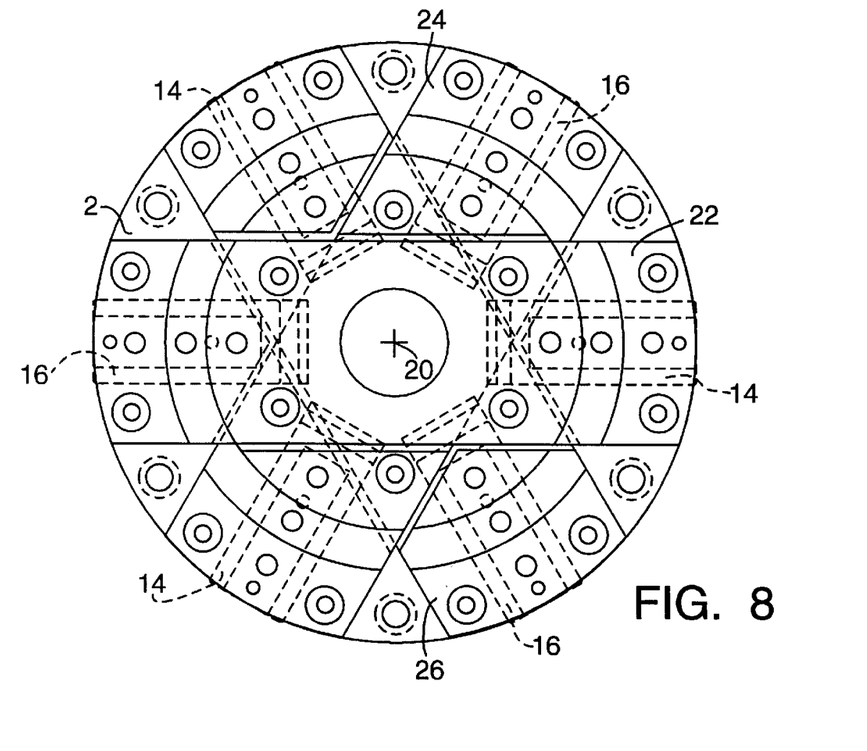
FIG. 8 is a top plan view of the chuck of FIG. 1 with the top jaws removed, and the master jaws shown in phantom.

As shown in FIG. 2, chuck body 2, which is adapted to be rotated around its rotational axis, has a first face 8 mountable to a rotatable machine tool spindle and a second face 12, opposite the first face, the second face 12 has a plurality of intersecting diametrical grooves 18, typically three (FIG. 7). A plurality of master jaws that each include a gripping jaw 14 and an associated ungripping jaw 16 are mounted within one groove of the plurality of grooves 18. In the embodiment of the present invention shown in the figures, each groove 18 passes through the rotational axis 20 of chuck body 2.

Alternatively, as an equivalent to each diametrical groove 18 passing through rotational axis 20, plural pairs of parallel grooves or tracks (not shown), each pair intersecting the others at the center of the chuck body, can be provided on second face 12, and the master jaws can be formed to bridge the parallel grooves. In either embodiment, as shown in FIG. 7, the gripping jaw 14 and associated ungripping jaw 16 of each master jaw are mounted in the same groove 18 (or set of parallel grooves) and on opposite sides of rotational axis 20. Since the master jaws 14, 16 are guided from both sides of rotational axis 20, jaw movement is extremely stable and precise.

The master jaws are preferably formed of bronze, carbon steel or coated steel. The chuck body 2 can be formed of titanium, steel, aluminum, cast iron, or other suitable material.

Steel is preferred. The chuck body 2 can be provided with any diameter.

Figure 3:
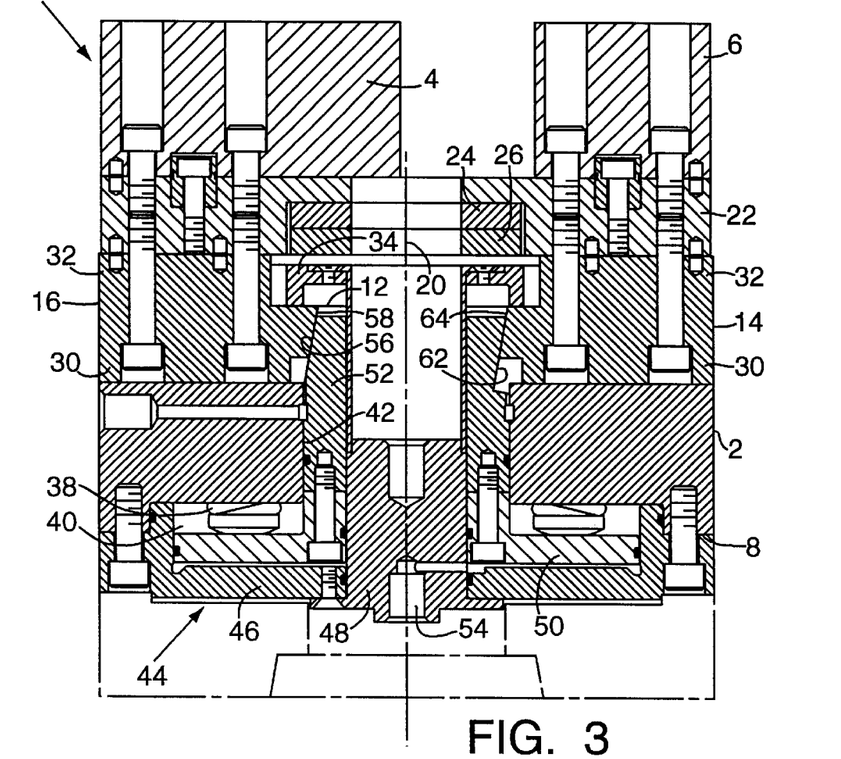
FIG. 3 is a transverse, sectional view of a second preferred embodiment of the present invention.

As is shown in FIGS. 2, 3 and 7, the gripping jaw 14 and associated ungripping jaw 16 of each master jaw are fixedly attached, for example, using bolts or other conventional attaching means, to a first side of one bridging member 22 of a plurality of bridging members (22, 24, 26). The bridging member 22 is preferably formed of steel, titanium or a composite material. As shown in FIGS. 2 and 3, OD top jaw 4 and the counterbalancing ID top jaw 6 are attached, for example, by use of bolts, to a second side of bridging member 22. Alternatively, master jaw 14, 16 and bridging member 22 can be formed as one piece by, for example, casting, forging or machining. The ID jaw 6 and OD jaw 4 are attached to the second side of bridging member 22 at positions corresponding substantially to gripping jaw 14 and ungripping jaw 16, respectively.

Upon rotation, the action of centrifugal force on ID jaw 6 dynamically compensates for the opposite centrifugal forces acting on OD jaw 4, preventing the loss of OD gripping force. ID jaw 6 can be configured to perfectly balance the centrifugal forces on OD jaw 4 or, alternatively, can be modified by, for example, increasing the mass or changing the center of mass, to generate an additional centrifugal force upon rotation that will actually cause an increase in the gripping force of OD jaw 4.

The bridging member 22 and master jaws 14, 16 form a unitary assembly to which different OD jaws 4 and matching ID jaws 6 can be attached, removed and reinstalled to grip different size workpieces, without affecting the precision fit between the jaws, or the dynamic balance of chuck 1. Because OD jaw 4 and ID jaw 6 attach to a top surface of bridging member 22, installation of top jaws with different configurations can be accomplished without disassembly of chuck body 2.

Figure 4:
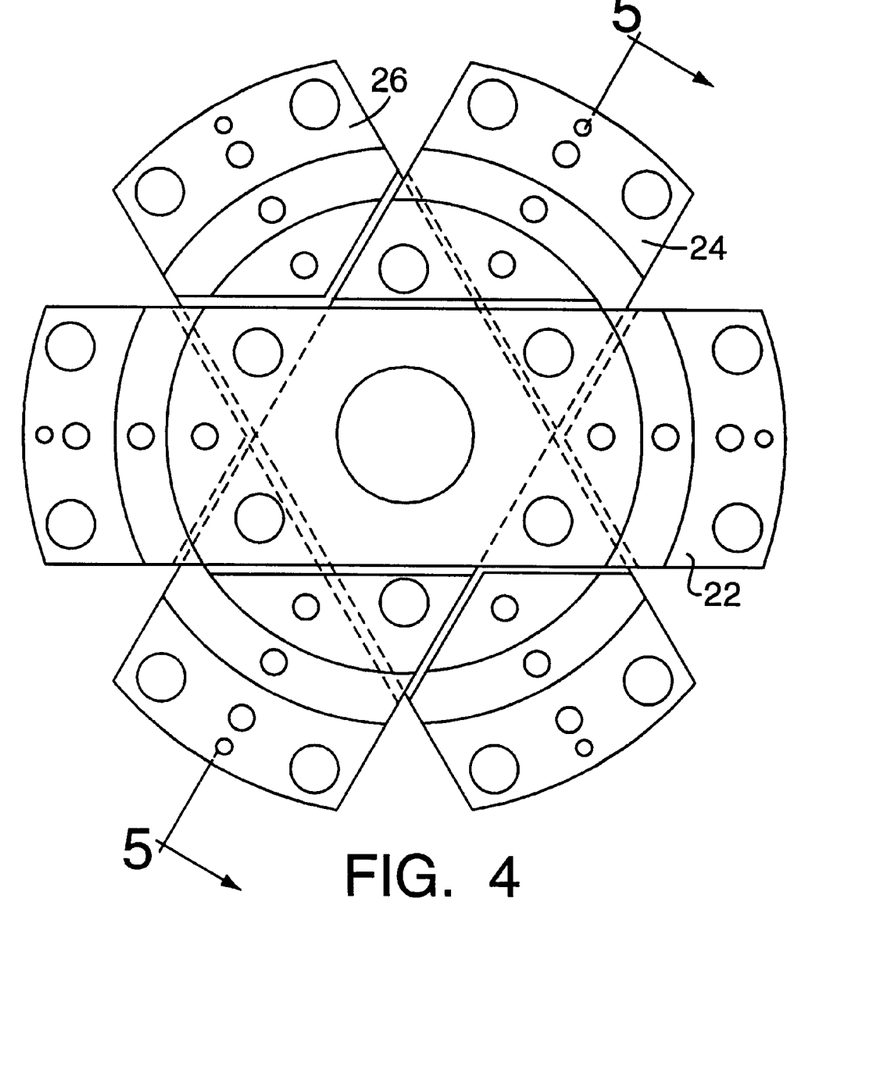
FIG. 4 is a top plan view of the interleaved bridging members in a preferred embodiment of the present invention.
Figure 5:
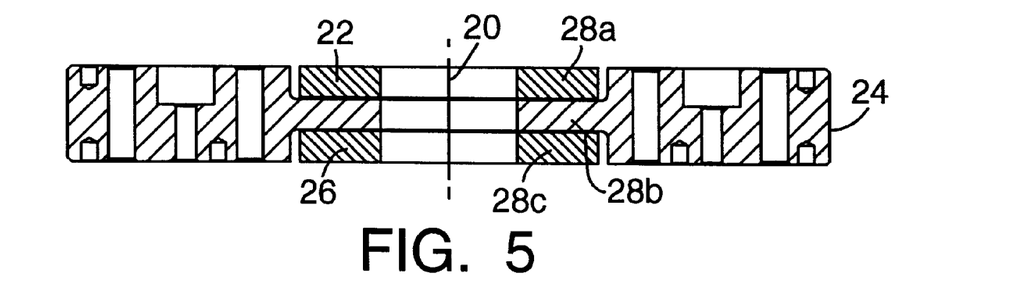
FIG. 5 is a transverse, sectional view taken along line 5—5 of FIG. 4.

As shown in FIGS. 4 and 5, each bridging member 22, 24, 26 can be provided with an area of reduced thickness 28a, 28b, 28c respectively corresponding substantially to the position of rotational axis 20, such that the bridging members can be interleaved. The reduced thickness will typically be equal to the non-relieved thickness of bridging members 22, 24, 26, divided by the number of bridging members, or master jaws. The interleaving allows bridging members 22, 24, 26 to extend across the entire diameter of chuck body 2.

Figure 6:
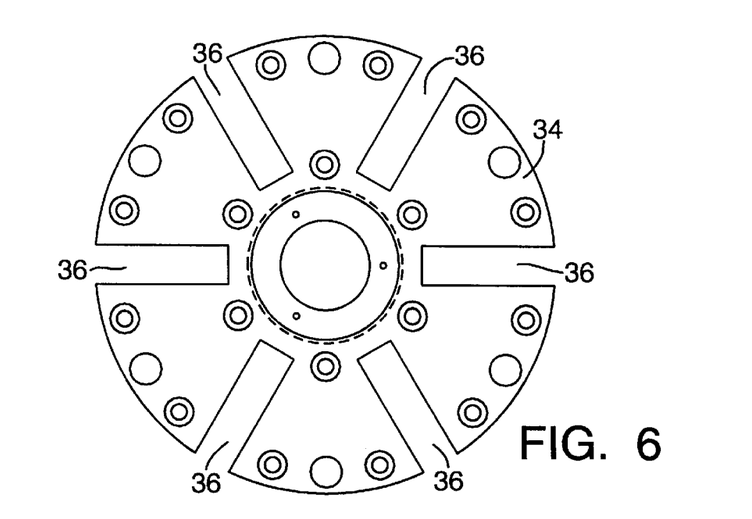
FIG. 6 is a top plan view of the web plate of the chuck of FIG. 1.

Referring to FIGS. 2 and 3, each master jaw is formed with a lower portion 30 and an upper portion 32 extending from lower portion 30. The lower portion 30 has a width that is slightly less than the width of groove 18 and a height substantially equal to the depth of the groove. The master jaws 14, 16 are held within groove 18 by a web plate 34, which is preferably formed of steel, and is attached, via screws, bolts or other conventional means, to the second face 12 of chuck body 2. The web plate 34, as shown in FIG. 6, has openings 36 formed therein corresponding in position to grooves 18. The openings 36 have a width that is less than the thickness of lower portion 30 of the master jaws, but greater than the thickness of upper portion 32. The upper portion 32 of the master jaws extend, at least partially through opening 36, to attach to bridging members 22, 24, 26. By using a combination of web plate 34, and master jaws provided with lower portions 30 and upper portions 32, groove 18 can be easily milled and ground with precision as compared to the use of a conventional inverted T-shaped groove.

The chuck of the present invention is self-centering. Actuation and deactuation of the chuck moves each gripping jaw 14 and ungripping jaw 16 the same distance so that a workpiece is automatically clamped in chuck 1 in alignment with rotational axis 20. In the embodiment of the invention shown in FIG. 2, the chuck is actuated and deactuated by movement of a draw tube 66, in a direction away from, and toward master jaws 14, 16, respectively. Draw tube 66 is attached to plunger 52. Plunger 52 is preferably formed of steel. Most preferably, plunger 52 is formed of steel having a Teflon® coating that provides for self lubrication.

Plunger 52 is provided with a first sloped camming surface 56 and a second parallel sloped camming surface 62. First sloped surface 56 and second sloped surface 62 engage a first mating camming surface 58, provided on ungripping jaw 16, and a second mating camming surface 64, provided on gripping jaw 14, respectively. When draw tube 66 is moved away from master jaws 14, 16, second sloped surface 62 contacts second mating surface 64, to move gripping jaw 14 away from rotational axis 20, such that ID jaw 6 will provide an ID gripping force and OD gripping jaw 4 moves toward axis 20 providing OD gripping force. At the same time, ungripping jaw 16, attached to gripping jaw 14 by bridging member 22, is moved toward rotational axis 20 while maintaining the same distance from the jaw 14.

When draw tube 66 is moved toward the master jaws, second sloped surface 62 disengages from second mating surface 64, and first sloped surface 56 engages first mating surface 58. Engagement between first sloped surface 56 and first mating surface 58 moves ungripping jaw 16 away from rotational axis 20 and gripping jaw 14 toward the rotational axis such that the OD gripping force provided by OD jaw 4 is released and ID gripping force of jaw 6 is released. Simultaneously, gripping jaw 14, attached to ungripping jaw 16 by bridging member 22, is moved toward rotational axis 20.

The plunger 52 is provided with three pairs of sloped camming surfaces 56,62 disposed at 120° angles about the rotational axis, as illustrated generally in FIG. 7, to actuate the three sets of master jaws and associated ID and OD jaws simultaneously in the same manner.

In a second, preferred embodiment of the present invention shown in FIG. 3, chuck 1 is constructed to be not only self-centering as described above, but also self-actuating. Thus, each OD jaw 4 is initially biased by internal mechanical actuating means toward rotational axis 20 to provide an OD gripping force, and each ID jaw 6 is initially biased by the internal mechanical means away from rotational axis 20 to provide an ID gripping force. For example, as shown in FIG. 3, chuck body 2 can be formed with a central bore 42 in which a fluid actuated piston and cylinder assembly 44 is mounted. The piston and cylinder assembly 44 includes a fluid cylinder 46, a piston guide 48, and a piston 50 connected with plunger 52. Fluid cylinder 46 attaches to the underside of chuck body 2 using bolts or other conventional means.

To place a workpiece in the chuck, or remove the workpiece from the chuck, a pressurized fluid source, such as a pressurized pneumatic or hydraulic fluid source, is attached to a fluid inlet 54. Pressurized fluid supplied to the interior of fluid cylinder 46 through fluid inlet 54 forces piston 50 and plunger 52 upward on piston guide 48 toward the master jaws.

In the same manner as described with reference to the embodiment of the present invention shown in FIG. 2, plunger 52 is formed with multiple pairs of a first sloped surface 56 and a second sloped surface 62. In the preferred embodiment of FIG. 3, upon application of fluid pressure, first sloped surface 56 moves to contact first mating surface 58 provided on ungripping jaw 16, causing OD jaw 4 to move away from rotational axis 20 and ID jaw 6 coupled with OD jaw 4 moves toward rotational axis 20. At the same time, second sloped surface 62 disengages a second mating surface 64 provided on gripping jaw 14. This allows a workpiece that is gripped on either an inside diameter or an outside diameter to be removed from chuck 1.

To clamp the workpiece in the chuck, pressure is relieved from fluid cylinder 46. In the absence of external pressurization, piston 50 and plunger 52 are is moved away from master jaws 14, 16 by springs 38 that are positioned in cylinder bore 40 formed in chuck body 2. The springs control the clamping force of the top jaws 4, 6 and can be replaced with springs having a higher and lower spring force in order to adjust the gripping force of the top jaws.

Upon movement of plunger 52 away from master jaws 14, 16, second sloped surface 62 engages second mating surface 64, provided on gripping jaw 14 moving OD jaw 4 toward rotational axis 20 to provide an OD gripping force, and simultaneously moving ID jaw away from rotational axis 20 to provide an ID gripping force. Because fluid pressure is only utilized when chuck 1 is stationary, a permanent fluid connection through a rotary joint, or other permanent actuator is not required to load and unload workpieces in the chuck. Instead, a fluid supply nozzle (not shown) can simply be connected through a feed tube in the machine tool spindle to fluid inlet 54 while the chuck is not rotating.

It should be understood that the foregoing description is only illustrative of the invention. Various alternatives and modifications can be devised by those skilled in the art without departing from the invention. For example, a reversible piston and cylinder assembly can be substituted for the self-actuating assembly; and fluid pressure instead of springs 38 can be used to regulate the gripping force of the jaws 4,6. A mechanical drive or other driven element can be used to operate the piston with sloped camming surfaces instead of the piston and cylinder assembly. The bridging members have been shown as individual members, but can also be designed integrally with the master jaws and the top jaws. The bridging members can also have other constructions and shapes to accommodate large unobstructed central bores in the chuck while still performing the bridging function between the jaws. Accordingly, the present invention is intended to encompass all such alternatives, modifications and variances that fall within the scope of the appended claims.

I claim:

1. A machine tool chuck comprising:
    a chuck body having a rotational axis and a plurality of diametral grooves on a surface of the chuck body and a central bore extending along the rotational axis of the chuck body for receiving a workpiece;

a plurality of jaws mounted to said chuck body within the diametral grooves provided on the surface of said chuck body, each of said plurality of jaws being dynamically balanced and including a gripping jaw and an associated ungripping jaw mounted within one of said diametral grooves on opposite sides of said rotational axis; and a bridging member fixedly attaching each gripping jaw and associated ungripping jaw and defining an opening generally aligned with said central bore of the chuck body to further accommodate a workpiece along said rotational axis.

2. The chuck of claim 1, therein:

a plurality of said gripping jaws and associated ungripping jaws are fixedly attached to a first side of a corresponding plurality of said bridging members proximal to said chuck body, and wherein:

said chuck further comprises a plurality of first top jaws, each being detachably attached to a second, opposite side of the respective bridging members at a position corresponding substantially to the one of said gripping and ungripping jaws; and a plurality of second, counterbalancing top jaws, each being detachably attached to said second side of the respective bridging members at a position corresponding substantially to the other of said gripping and ungripping jaws.

3. The chuck of claim 2, further comprising means to selectively move said jaws so that said plurality of first top jaws are selectively moved toward and away from said rotational axis.

4. The chuck of claim 3, wherein said plurality of second, counterbalancing top jaws are moved away from said rotational axis when said first top jaws are moved toward said rotational axis, and said second, counterbalancing jaws are moved toward said rotational axis when said first top jaws are moved away from said rotational axis.

5. The chuck of claim 2, wherein said first top jaws and said second counterbalancing top jaws can be removed from said bridging member and replaced with other first top jaws and other second counterbalancing top jaws, respectively, without removing said bridging member from said chuck body.

6. The chuck of claim 2, wherein the mass and center of gravity of each of said plurality of second counterbalancing top jaws is configured to provide a centrifugal force during rotation opposite, and at least equal to, a centrifugal force that acts on said first top jaw.

7. The chuck of claim 2, wherein said plurality of second counterbalancing top jaws function as a plurality of clamping jaws.

8. The chuck of claim 7, wherein said plurality of first top jaws are OD clamping top jaws and said plurality of second top jaws are ID clamping top jaws.

9. The chuck of claim 8, wherein each of said plurality of OD clamping top jaws is detachably attached to one of said bridging members at a position corresponding substantially to the position of said ungripping jaw, and each of said plurality of ID clamping top jaws is detachably attached to one of said bridging members at a position corresponding substantially to the position of said gripping jaw.

10. The chuck of claim 9, further comprising means to selectively move said jaws, whereby said plurality of ID clamping top jaws are selectively moved toward and away from said rotational axis.

11. The chuck of claim 10, wherein said plurality of OD clamping top jaws are moved away from said rotational axis when said ID clamping top jaws are moved an equal distance toward said rotational axis, and said OD clamping top jaws are moved toward said rotational axis when said ID clamping top jaws are moved an equal distance away from said rotational axis.

12. The chuck of claim 1, wherein each of the jaws comprises a lower portion having a width that is slightly less than a width of said grooves provided in said chuck body, a height substantially equal to the depth of said grooves, and an upper portion, extending from said lower portion; and, wherein said upper portion has a thickness that is less than the thickness of said lower portion, and is adapted to attach to said bridging member.

13. The chuck of claim 12, further comprising a web plate adapted to be connected to said face of said chuck body, said web plate being provided with a plurality of web plate openings corresponding in position to said grooves, said plurality of openings having a width that is less than the thickness of said lower portion of said jaw, whereby said web plate holds said master jaws within said grooves with said upper portions extending at least partially through said openings when attached to said chuck body.

14. The chuck of claim 1, wherein said bridging member has a thickness with the thickness being reduced in an area in substantial alignment with the rotational axis of said chuck, whereby a plurality of said bridging members of each of said plurality of master jaws interleave at said area of reduced thickness.

15. The chuck of claim 14, wherein there are three master jaws.

16. The chuck of claim 15, wherein said interleaved bridging members include a top bridging member on which said thickness is reduced from said first side, a lower bridging member on which said thickness is reduced from said second side, and a middle bridging member on which one half of the reduction in thickness is made from each of said first side and said second side.

17. The chuck of claim 10, wherein said means for selectively moving said jaws is a plunger within said central bore.

18. The chuck of claim 17, wherein said plunger is provided with a first sloped surface adapted to selectively contact a first mating surface provided on said ungripping jaw, and a second sloped surface adapted to selectively contact a second mating surface provided on said gripping jaw, and wherein movement of said plunger in a first direction to a first position causes said first sloped surface to contact said first mating surface to move said ungripping jaw away from said rotational axis, and movement of said plunger in a second direction, opposite said first direction, to a second position, causes said second sloped surface to contact said second mating surface to move the associated gripping jaw away from said rotational axis.

19. The chuck of claim 18, wherein movement of said plunger in said first direction moves said plurality of OD gripping jaws away from said rotational axis and simultaneously moves said plurality of ID gripping jaws an equal distance toward said rotational axis, and wherein movement of said plunger in said second direction moves said plurality of OD gripping jaws toward said rotational axis and simultaneously moves said plurality of ID gripping jaws an equal distance away from said rotational axis.

20. The chuck of claim 19, wherein said plunger is moved by a draw tube in said first direction and said second direction.

21. The chuck of claim 19, wherein said plunger is maintained at said second position by internal biasing means.

22. The chuck of claim 21, wherein said plunger is moved to said first position by application of fluid pressure from an external force, and said plunger returns to said second position upon relief of said fluid pressure.

23. The chuck of claim 21, wherein said biasing means comprises at least one spring.

24. The chuck of claim 22, wherein said fluid pressure is air pressure.

25. The chuck of claim 22, wherein said fluid pressure is hydraulic pressure.

26. A machine tool chuck comprising a chuck body having a rotational axis;

first and second jaws mounted on the chuck body at opposite sides of the rotational axis and moveable relative to the chuck body and the rotational axis in a radial direction;

bridging means interconnecting the first and second jaws at opposite sides of the rotational axis for causing the jaws to move together in the radial direction, one jaw moving radially outward away from the rotational axis, and the other jaw moving radially inward toward the rotational axis; and actuating means including a plunger associated with a pair of oppositely disposed first and second jaws and the bridging means for moving the jaws and bridging means together in the radial direction;

the plunger being moveable along the rotational axis of the chuck body and having first and second camming surfaces disposed on opposite sides of the rotational axis and in generally parallel relationship, the first camming surface pushing the first jaw radially outward from the rotational axis while the bridging means interconnecting the jaws draws the second jaw radially inward, and the second camming surface pushing the second jaw radially outward while the bridging means draws the first jaw radially inward whereby the bridging means and not the plunger serves to draw the jaws radially inward.

27. A machine tool chuck as defined in claim 26 wherein a plurality of pairs of first and second jaws are mounted on the chuck body at angularly disposed positions about the rotational axis of the body;

a corresponding plurality of bridging means interconnect the plurality of pairs of first and second jaws respectively; and the plunger is connected with each pair of the first and second jaws for operating the jaws together simultaneously.

28. A machine tool chuck as defined in claim 26 wherein the first and second jaws have associated camming surfaces mating respectively with the camming surfaces on the opposite sides of the plunger, whereby axial motion of the plunger in one direction moves the oppositely disposed jaws radially together in one direction, and axial motion of the plunger in the opposite direction moves the jaws radially together in the opposite direction.

29. A machine tool chuck as defined in claim 26, wherein one of the first and second jaws is adapted to be an inside diameter (ID) jaw and the other jaw is adapted to be outside diameter (OD) jaw.

30. A machine tool chuck as defined in claim 26, wherein the plunger is biased for moving the oppositely disposed jaws together to a preferred radial position on the chuck body.

31. A machine tool chuck as defined in claim 27 wherein the plurality of bridging means include a plurality of interleaved bridging plates.

32. A machine tool chuck as defined in claim 31 wherein a central bore is defined on the rotational axis through the chuck body, bridging means, and plunger for accommodating a workpiece along the rotational axis.

* * * * *

UNITED STATES PATENT AND TRADEMARK OFFICE
CERTIFICATE OF CORRECTION

PATENT NO. : 6,017,266  
DATED : January 25, 2000  
INVENTOR(S) : Oleg Tabachenko Page 1 of 1

It is certified that error appears in the above-identified patent and that said Letters Patent is hereby corrected as shown below:

<u>Column 7, claim 2,</u>  
Line 15, please delete "therein" and insert -- wherein --.

<u>Column 8, claim 13,</u>  
Line 23, please delete "master".

<u>Column 8, claim 14,</u>  
Line 29, please delete "master".

<u>Column 8, claim 15,</u>  
Line 31, please delete "master".

Signed and Sealed this

Sixteenth Day of April, 2002

Attest:

JAMES E. ROGAN  
*Director of the United States Patent and Trademark Office*

*Attesting Officer*